United States Patent [19]

Glasheen

[11] Patent Number: 4,892,381
[45] Date of Patent: Jan. 9, 1990

[54] HIGH TEMPERATURE FIBER OPTIC CONNECTOR

[75] Inventor: Wiliam M. Glasheen, Derry, N.H.

[73] Assignee: Ametek, Inc., New York, N.Y.

[21] Appl. No.: 292,063

[22] Filed: Dec. 30, 1988

[51] Int. Cl.$^4$ .................................................. G02B 7/26
[52] U.S. Cl. ................................... 350/96.22; 29/851; 350/96.20
[58] Field of Search ............... 350/96.20, 96.21, 96.22, 350/320; 29/851; 419/8, 30, 35

[56] References Cited

U.S. PATENT DOCUMENTS

| | | | |
|---|---|---|---|
| 4,357,072 | 11/1982 | Goodfellow et al. | 350/320 X |
| 4,396,247 | 8/1983 | Simon et al. | 350/96.21 X |
| 4,488,773 | 12/1984 | Wagner | 350/96.29 X |

*Primary Examiner*—William L. Sikes
*Assistant Examiner*—Akm E. Ullah
*Attorney, Agent, or Firm*—Amster, Rothstein & Ebenstein

[57] ABSTRACT

A high temperature optical fiber connector in which the optical fiber bundle is physically bonded to the connector body by sintered metallic body contained in an interior cavity of the connector.

13 Claims, 1 Drawing Sheet

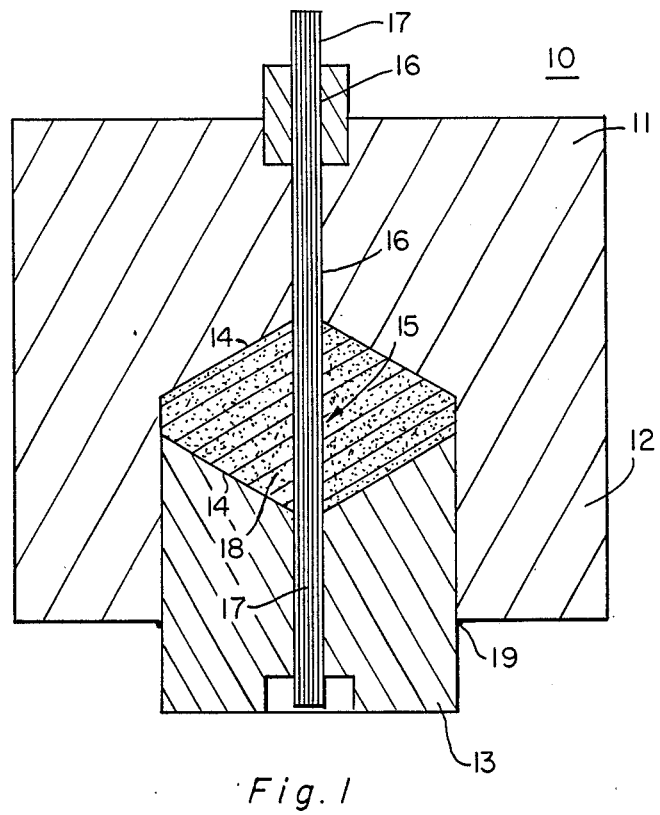
Fig. 1
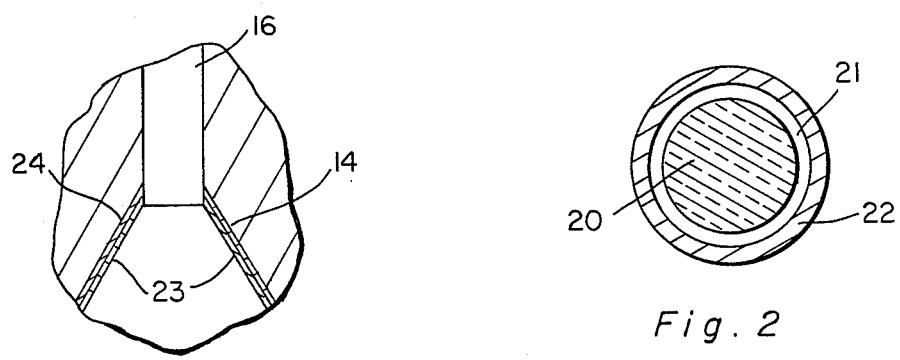
Fig. 3
Fig. 2

HIGH TEMPERATURE FIBER OPTIC CONNECTOR

This invention relates to an optical fiber connector or ferrule and to a method for fabricating the connector and, more particularly, one in which a fiber optic bundle is bonded to the connector by a metal powder compact.

BACKGROUND OF THE INVENTION

As optical fibers come to be used in increasingly harsh environments, such as in jet engines, for example, the fiber connectors, and ferrules to which the optical fibers are fastened must be ruggedized to survive the much more rigorous temperature and vibration environments to which they are exposed.

An optical fiber connector, or ferrule, which is resistant to high temperature, temperature shock, and vibration may be realized in a structure in which metal coated fibers passing through the ferrule or connector are bonded to the ferrule or connector through a metallic compact which is prepared in situ in the interior of the ferrule or connector.

The term "bonding" is used in its broadest sense to including sintering and brazing of powdered metals or brazing fillers. "Brazing" as used herein means a method of joining metals by applying heat to a brazing filler which has a melting temperature below that of the metals being joined. As the brazing filler melts, there is a flow of the brazing filler by capillary action to wet the metals to be joined and create a metallurigical bond between them at the molecular level. "Sintering" as used herein means a welding together of metallic particles in a powder form at a temperature below the melting point of the metallic particles but above one-half (½)of the melting point. While "sintering" may occur solely with the application of heat, it may also take place in so-called hot pressing or sintering under pressure by the simultaneous application of temperature and pressure.

The invention comprises a two part ferrule or connector structure in which each part has a conical shaped interior cavity. When assembled the ferrule has an interior chamber in form of a conical annulus surrounding the metal coated optical fibers passing through the connector. The chamber is filled with a metal powder or brazing filler. The connector is subjected to temperature and pressure to form a metal compact by sintering or brazing. The materials in the chamber are bonded to the optical fiber bundle and to the interior wall of the connector chamber. This bonding of the optical fiber bundle, and the wall of the connector results in a connector with excellent temperature and vibration resistance characteristics.

It is therefore a principal objective of the invention to provide a method and apparatus for bonding optical fibers to a connector.

It is a further objective of the invention to produce an optical fiber connector which is operative at high temperatures and high vibration levels.

Yet another objective of the invention is to provide an optical fiber connector in which the optical fiber is physically bonded to the connector element.

Still another objective of the invention is to provide a high temperature connector for optical fibers in which the optical fibers are physically bonded to the connector by sintering.

Yet a further objective of the invention is to provide a method for producing a high temperature optical fiber connector through a sintering of a powdered compact.

Other objectives and advantages of the invention will become readily apparent as the description proceeds.

BRIEF DESCRIPTION OF THE INVENTION

The various objectives and advantages of the invention are realized by a fiber optic connector construction, in which an optical fiber bundle, extending axially through the connector, is bonded to the connector by a sintered or brazed metal compact. The optical fiber connector consists of two mating portions with a central or axial bore extending through the two mating portions to receive an optical fiber bundle of metal coated fibers. The mating faces of the connector components include conical cavities with the axial bores communicating with the cavities. When the connector is assembled a conically shaped interior chamber or annulus surrounds the optical fiber bundle. In a preferred embodiment the fibers are gold coated and a gold sintering powder or a gold containing eutectic brazing filler is positioned in the chamber for the in situ production of a metallic compact for bonding the fibers to the housing by the simultaneous application of heat and pressure to the connector. Because of the conical cross-section of the chamber application of axial pressure to the connector results in the force component in the direction of the bundle compressing the fiber bundle radially as sintering or brazing takes place. This produces a good physical bond between the fibers, the sintered body and the chamber walls; a bond which has excellent temperature and vibration resistance characteristics.

BRIEF DESCRIPTION OF THE DRAWINGS

FIG. 1 is a sectional view showing the structure of the optic fiber connector and optic fiber bundle structure.

FIG. 2 is a sectional view of an individual metal coated optical fiber useful in the invention.

FIG. 3 is a small sectional cutaway view of the cavity in one of the connector components showing surface coating of the cavity to enhance sintering.

DETAILED DESCRIPTION OF THE INVENTION

FIG. 1 is an exemplary illustration of the high temperature optic connector assembly of the instant invention using a sintered powder compact and shows the internal chamber configuration of the connector and the sintered body which provides a physical bonding of the optic fiber bundle passing through the connector to the connector body.

The optical fiber connector or ferrule shown generally at 10 consists of a cylindrical connector or ferrule body 11 having a skirt portion 12 at its lower end for receiving a cylindrical mating insert 13. Connector body 11 and insert 13 are preferably fabricated of a low expansion metal; i.e., a metal which has a low temperature coefficient of expansion, such as sSainless Steel or Hastaloy X. Body 11 and insert 13 each have a generally conically shaped cavities 14 at their mating surface to form a chamber 15 when the connector is assembled.

Axial bores 16 extend through main body 11 and insert 13 and communicate with cavities 14 to allow an optic fiber bundle 16 consisting of a plurality of individual, metal coated fibers to pass through the connector.

A sintered metallic body 18 fabricated in situ bonds the individual fibers of the bundle to the connector.

In a preferred embodiment, the individual optical fibers are gold coated as this provides good temperature and vibration characteristics. Consequently, body 18 is a compact of sintered gold particles. The optical fibers, as shown in FIG. 2, preferably have a two hundred (200) micron diameter silicon core 20 surrounded by a twenty (20) micron doped silicon cladding layer 21 coated by a by a twenty-five (25) micron gold layer 22 so the fiber diameter is approximately 290 microns.

Gold coated optical fibers of this sort are commercially available from a variety of sources and one source for these fibers is Fiberguide Industries, 1 Bay Street, Sterling, N.J. 07980. The gold coating on the fiber enhances sintering of the fibers to the gold powder compact bonding element in the chamber. After the connector has been assembled and in situ formation of the metallic bonding compact takes place in the chamber, by sintering or brazing of a gold powder or a gold containing brazing filler, the junctions 19 around insert 13 and skirt 12 of the main connector body 11 are secured by laser welding.

In order to enhance bonding of the metallic powder or brazing filler to the interior wall of the chamber, the interior wall is preferably coated with a layer of the same metal contained in the sintering powder or the brazing filler. FIG. 3 illustrates in a partial sectional view, the manner in which the interior wall is treated. Thus, the ferrule body 11 is shown with bore 16 communicating with conical chamber 15. Deposited on the wall of chamber 15 are dual metallic layers 23 and 24. In the case of a gold coated fiber and of a gold powder or a eutectic gold brazing material, the wall layer facing the chamber is gold coated. Thus, outer layer 24 is a thin, (20 micron or so) layer of gold deposited on top of a 20 micron nickel layer which adheres to the interior wall surface of chamber 15. The nickel and gold layers may be deposited in any of a variety of well-known techniques, such as electrodeposition, etc. The important element is that chamber surface to which the body of sintered or brazing material is bonded be the same as that of metal fiber coating.

EXAMPLE I

A two piece ferrule of the type illustrated in FIG. 1 was prepared with the ferrule body and insert being fabricated of Hastelloy X. The axial bores in the two ferrule components retained a bundle of optical fibers consisting of a silcon core, a doped silicon cladding layer and a gold hermetic coating; with the bundle diameter being 3.2 millimeters. The bundle was first passed through the axial bores of body 11 and insert 13 and through the conical cavity. The conical cavity in body 11 was filled with a pure gold powder (EP 1075) obtained from EMCA Company, a subsidiary of ROHM-HAAS of 609 Center Avenue, Mamaroneck, N.Y. having a five micron (5μ) average particle diameter. After insert 13 was mounted in the skirt portion of the main body the components were ultrasonically shaken to compact and distribute the powder. The ferrule parts were then placed in compression by applying axial forces of one (1) ton per square inch. This pressure, as pointed out before, further compacts the powder and exerts a radial force on the fiber bundle extending through the ferrule.

The two part ferrule, still in compression, was then placed in an induction heating coil and the combination mounted in a quartz tube which was maintained in an inert argon atmosphere. Current was applied to the induction heater coil and the assembly heated to elevate the temperature of the ferrule body and insert to 630° C. (1166° F.) [which is approximately 60% of the melting temperature of gold (1034° C. or 1897° F.] for a period of one (1) hour to form the sintered powder compact which bonds the gold coated optic fibers to the interior wall of the ferrule.

Although in the Example described above, the ferrule was heated to a temperature of approximately 1166° F., the preferred temperature range is between 1400°-1500° F. although this is not critical. Depending on the temperature, the time necessary to produce sintering will vary since temperature and time are interrelated in the sintering process.

A fiber bundle ferrule fabricated in the manner described above, was then tested for resistance to temperature, temperature shock, and vibration. This ferrule and fiber connector assembly was exposed to 540° C. for several hundred hours; exposed to temperature shock by cycling the temperature between 540° C. and 20° C. about thirty (30) times. The assembly was then exposed to 50 gs of vibration along two axes for a total of 36 hours. Upon examination it was found that the fiber bundle and ferrules remained intact and the fibers did not shift or break. It is thus obvious, that ferrule or connector in which metal coated fibers are bonded to the walls of the ferrule through a sintered powder compact results in a high temperature, temperature shock resistant and vibration resistant optical fiber connector.

EXAMPLE II

A further embodiment of the invention was also fabricated in which of the metal coated optical fibers were bonded to the interior of the ferrule by a brazed metal compact. A two part ferrule of the type illustrated in FIG. 1 was prepared with the interior walls covered by nickel-gold layer. The conical ferrule chamber was filled with a brazing filler consisting of an 18% nickel 82% gold eutectic which has a melting temperature of 950° C. (1742° F.) and which is available from the Lucas-Milhaupt Special Metals Division of Englehardt Corporation in Mansfield Mass. As was described Previously with respect to Example I, the two parts were brought together and submitted to 1 ton/in² axial forces. The ferrule was heated to 1800° F. for sixty (60) seconds thereby brazing the metal covered optical fibers to the interior walls of the ferrule/connector.

It will now be apparent that highly reliable, high temperature, of vibration resistant optical fiber ferrule/connector structure has been described in which a physical bonding of the metal coated fibers to the interior of the ferrule connector are achieved by a physical bonding thereof through bodies of either sintered or brazed materials. Simultaneously, a process has been described in which a plurality of metal coated fibers are positioned in a ferrule surrounded by a metallic powder or a brazing filler and subjected to heat and temperature to form a body which physically bonds the optical fibers to the wall of the ferrule through the medium of the sintered or brazed body.

While the instant invention has been described in connection with a preferred embodiment and with a preferred embodiment of the process steps, the invention itself is by no means limited thereto, since many modifications in the instrumentalities employed and in the steps of the process may be made without departing from the true spirit and scope of the invention.

What is claimed as new and desired to be secured by U.S. Letters Patent is:

1. A high temperature optic fiber connector comprising:
   (a) a connector body having an interior chamber;
   (b) axial passage means through said body communicating with said chamber;
   (c) at least one metal coated fiber positioned in said axial passage means and passing through said chamber;
   (d) means for bonding said metal coated optic fiber to the walls of said chamber including a sintered metallic compact adhering both to said optic fiber and said wall, said compact containing the same metal as the metal coating of said fiber.

2. The optic fiber connector according to claim 1 wherein said metal is gold and said bonding means is a sintered gold powder body bonded both to the gold metal coating of said optic fiber and the chamber wall.

3. The optic fiber connector according to claim 2 wherein said chamber wall has a gold coating layer.

4. A high temperature optic fiber connector comprising:
   (a) first and second mating connector portions each having a cavity located at their mating surfaces to form an interior chamber in said connector;
   (b) axial bores in said first and second portions communicating with the cavities in each portion;
   (c) a metal coated optical fiber bundle passing through said bores and said chamber;
   (d) A metal compact located in said chamber surrounding said bundle and bonded to the metal coated fibers and to the wall of said chamber for securing said bundle to said connector.

5. The optic fiber connector according to the claim 4, wherein said chamber has a generally conical configuration to facilitate in situ formation of the bonding compact.

6. The optic fiber connector according to claim 4 wherein said metal bonding compact is a sintered powder compact of the same metal as the metallic fiber coating.

7. The optic fiber connector according to claim 4 wherein said metal bonding compact is a brazed compact containing the same metal as the metallic fiber coating.

8. A process for fabricating an optical fiber connector with in situ bonding of metal coated optical fibers to the interior of the connector comprising the steps of:
   (a) positioning a fiber optic bundle containing at least one metal coated optic fiber in a connector having an interior chamber;
   (b) filling said chamber with a metal powder of the same sort as the fiber metal coating;
   (c) heating said connector to produce a metal compact from said powder for bonding said compact to said bundle and to said connector.

9. The process according to claim 8 wherein said connector is heated to a temperature sufficient to sinter said metal powder, said sintered metal compact bonding said optic fiber bundle to said connector.

10. The process according to claim 8 wherein said connector is heated to a temperature sufficient to braze said metal powder, said brazed metal compact bonding said optic fiber bundle to said connector.

11. The process according to claim 8 wherein said powder is compressed during heating.

12. The process according to claim 9 wherein said powder is compressed during heating.

13. The process according to claim 10 wherein said powder is compressed during heating.

* * * * *